United States Patent [19]
Yasuki et al.

[11] Patent Number: 5,742,353
[45] Date of Patent: Apr. 21, 1998

[54] IMAGE PROCESSING APPARATUS

[75] Inventors: Seijiro Yasuki; Hiroyuki Chimoto, both of Yokohama, Japan

[73] Assignee: Kabushiki Kaisha Toshiba, Kawasaki, Japan

[21] Appl. No.: 622,145

[22] Filed: Mar. 27, 1996

[30] Foreign Application Priority Data

Mar. 30, 1995 [JP] Japan ................................. 7-073298

[51] Int. Cl.$^6$ ................................................. H04N 7/01
[52] U.S. Cl. .............. 348/578; 348/452; 348/699; 348/580; 382/41; 395/125; 395/118; 395/130
[58] Field of Search ........................ 348/578, 580, 348/452, 699, 585, 590, 581, 441; 395/118, 125, 130, 147, 149; 382/41, 45, 46, 47; H04N 7/01

[56] References Cited

U.S. PATENT DOCUMENTS

| | | | |
|---|---|---|---|
| 4,463,372 | 7/1984 | Bennett et al. | 358/22 |
| 4,472,732 | 9/1984 | Bennett et al. | 358/22 |
| 4,641,188 | 2/1987 | Dischert | 358/140 |
| 4,790,025 | 12/1988 | Inoue et al. | 382/41 |
| 5,093,720 | 3/1992 | Krause et al. | 358/133 |
| 5,307,450 | 4/1994 | Grossman | 395/123 |
| 5,376,971 | 12/1994 | Kadono et al. | 348/699 |

FOREIGN PATENT DOCUMENTS

| | | |
|---|---|---|
| 0 599 579 | 6/1994 | European Pat. Off. |
| 0 613 098 | 8/1994 | European Pat. Off. |

OTHER PUBLICATIONS

ITE Technical Report vol. 17, No. 31, pp. 19–24, A Study on Scanning Line Conversion Technique on Frame Basis. "Broadcasting Method", Nippon Hoso Shuppan Kyokai, pp. 138–141.

"Broadcasting Method" Nippon Hoso Shuppan Kyokai, pp. 244–251.

ITE Technical Report vol. 17, No. 65, pp. 19–41, (Oct., 1993).

N. Kawai et al., A Study of ISDB Broadcasting System, ITEJ Technical Report vol. 15, No. 35, pp. 31–36, BCS' 91–18, ROFT' 91–38 (Jun. 1991); K.Ohsaki et al., A Layered Model for ISDB System, 1993 ITE Annual Convention,pp. 275 & 276; and T.Yoshimura et al., A Study on Extended Functions for Digital Television Service, 1993 ITE Annual Convention,pp. 279 and 280.

Nikkel Electronics, No. 608, May 23, 1994, pp. 82–89.

Preprint of 1994 Annual Convention of ICCE pp. 12 to 13.

Preprint of 1994 Annual Convention of Institute of TV Engineers of Japan pp. 419 to 420.

*Primary Examiner*—Glenton B. Burgess
*Attorney, Agent, or Firm*—Cushman Darby & Cushman IP Group of Pillsbury Madison & Sutro LLP

[57] ABSTRACT

In a scanning line converting operation, an image signal is processed through a system including memories, switches, arithmetic circuits, an adder, a subtracter and a switch. In a graphic process, coordinate data processed by a parameter generator and a drawing unit is subjected to a coordinate converting calculation by the arithmetic circuits and supplied to an address generator. Based on an address generated by the address generator, a texture model, which has been stored in a memory under control of a CPU, is read out and supplied to a synthesizing circuit. In the synthesizing circuit, the texture model is attached to a polygon output from a drawing unit.

4 Claims, 8 Drawing Sheets

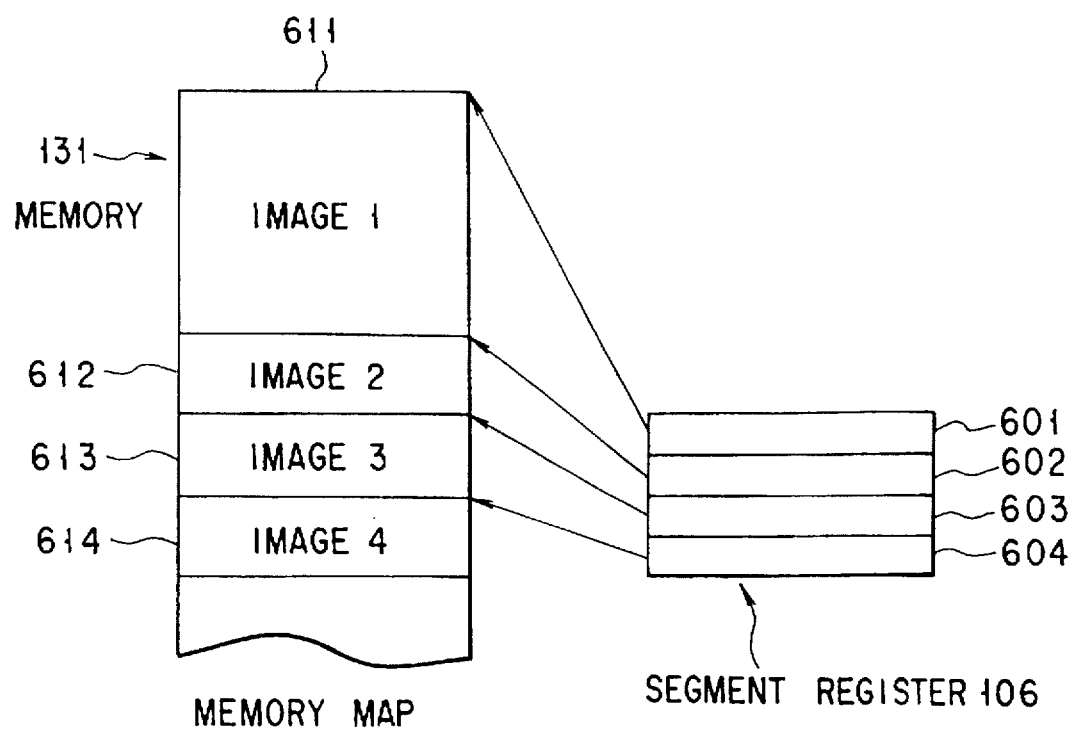
F I G. 3
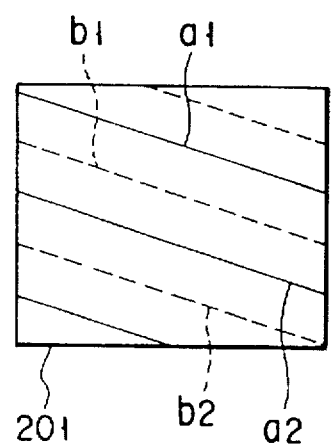
F I G. 4A

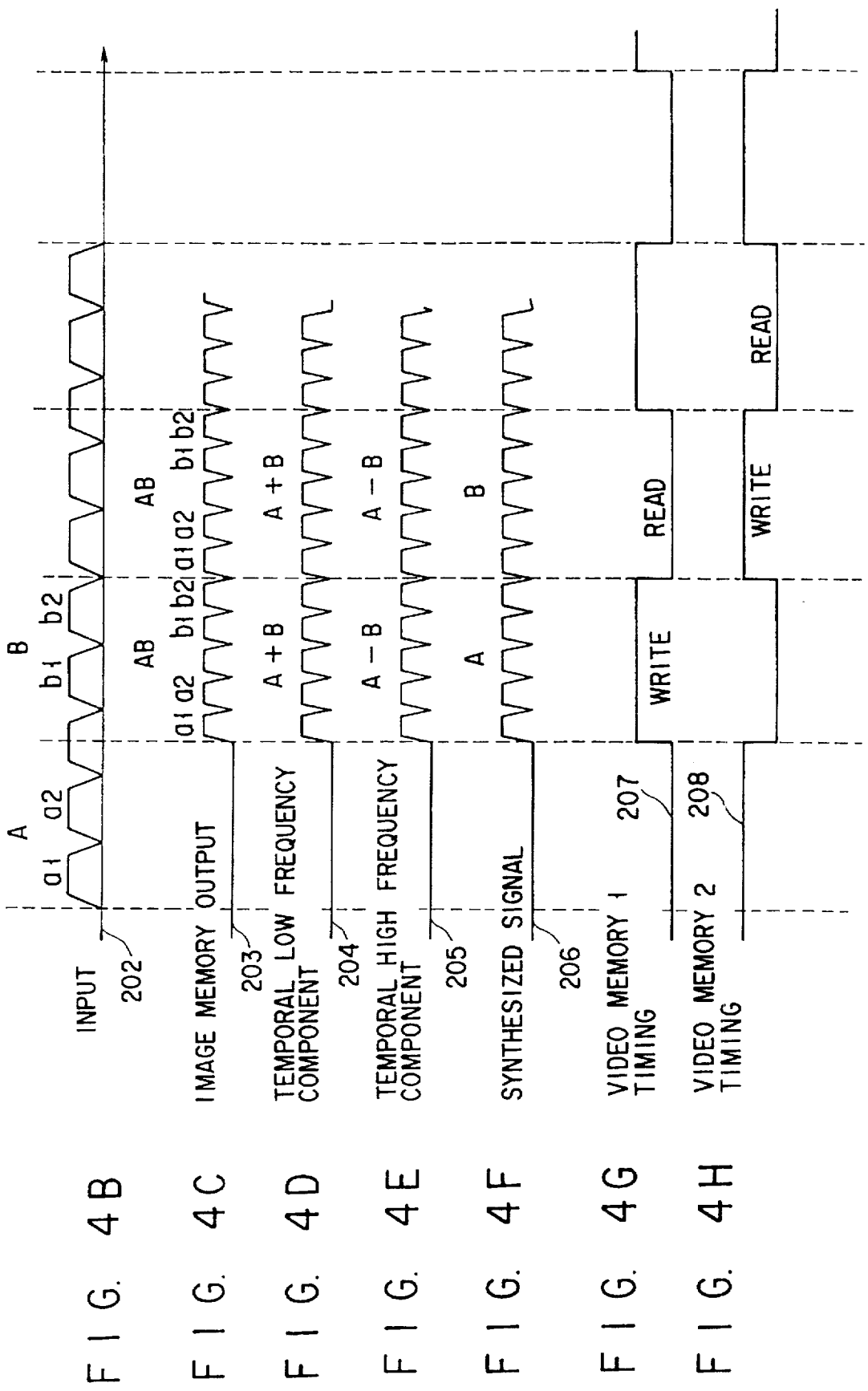

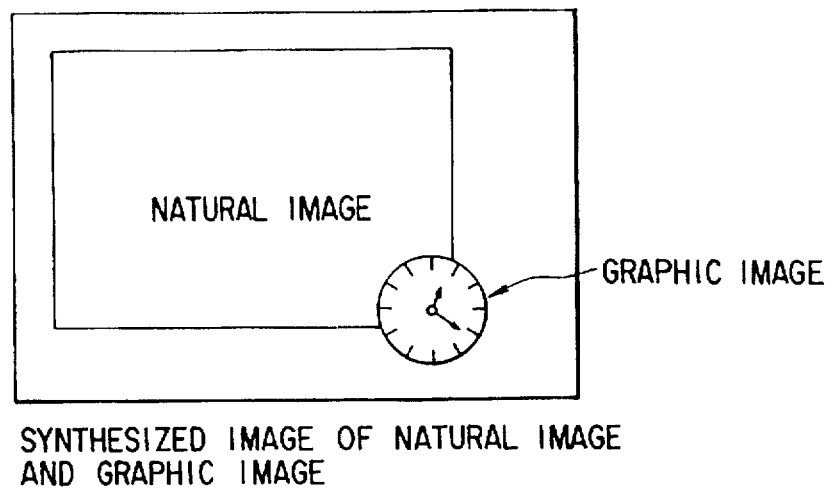
SYNTHESIZED IMAGE OF NATURAL IMAGE
AND GRAPHIC IMAGE
F I G. 6
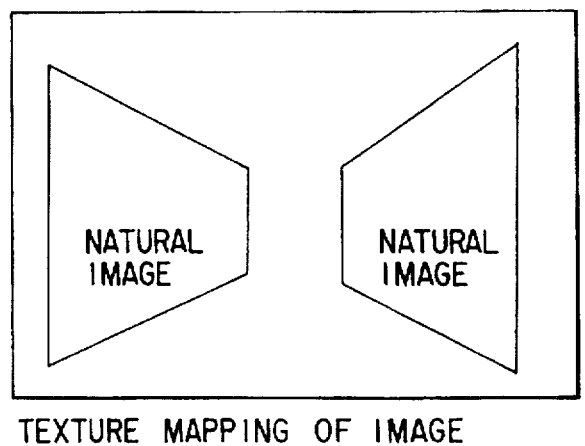
TEXTURE MAPPING OF IMAGE
F I G. 9
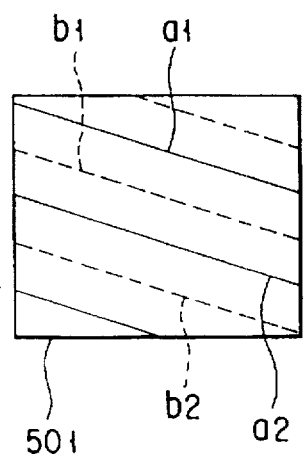
F I G. 8A

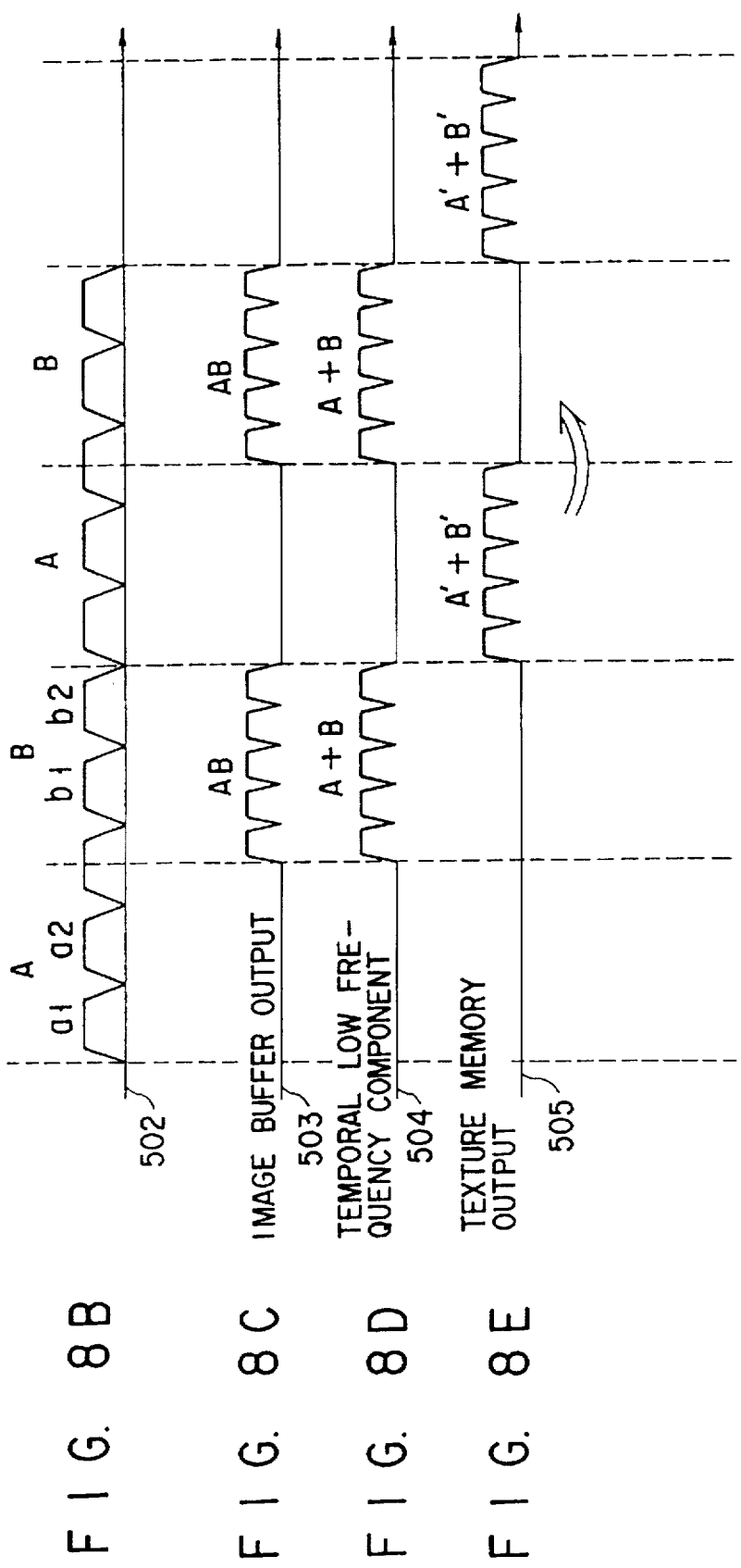

IMAGE PROCESSING APPARATUS

BACKGROUND OF THE INVENTION

1. Field of the Invention

The present invention relates generally to a television receiver adaptable to various television broadcasting services, including a two-way communication function, and image formats, and more particularly to an improved image processing apparatus adapted to generation of a graphic image available for GUI (Graphic User Interface) or data services.

2. Description of the Related Art

As well known, the current television broadcasting services include the following broadcasting system.

(1) An NTSC (National Television System Committee) color television broadcasting system.

This broadcasting system is described in detail in "Broadcasting Method" (Nippon Hoso Shuppan Kyokai, Jun. 20, 1984), pp. 138–141.

(2) A combined system of the NTSC color television broadcasting system and a teletext system.

The teletext system is described in detail in "Broadcasting Method" (Nippon Hoso Shuppan Kyokai, Jun. 20, 1984), pp. 244–251.

(3) A second-generation EDTV (Extended Definition Television) broadcasting system using the digital technology.

This broadcasting system is described in detail in ITE Technical Report, Vol. 17, No. 65, pp. 19–41 (October 1993).

(4) An ISDB (Integrated Service Digital Broadcasting) utilizing a satellite.

This broadcasting system is described in detail in ITEJ, Vol. 15, No. 35, pp. 31–36, BCS' 91-38 (June 1991), and papers "Hierarchical Model of ISDB" in Annual Convention of Television Society, ITE' 93 (15-6) and "A Study on Extended Functions for Digital Television Services" pp. 279–280.

(5) A digital CATV (Cable Television) broadcasting system having a two-way communication function.

This broadcasting system is described in detail in "Nikkei Electronics" (May 23, 1994), pp. 82–89.

As described above, at present, various television broadcasting systems exist and various broadcasting services are available. Accordingly, there are various image formats. With the existence of the various television broadcasting services and image formats, it is required to develop a television receiving system adaptable to all the services and formats.

FIG. 1 is a schematic diagram showing the television receiving system. As shown in FIG. 1, a TV (television) receiver 4010 receives signals transmitted from an ISDB transmitter 4001, an NTSC current broadcasting transmitter 4002, a teletext transmitter 4003 and a two-way digital CATV station 4004.

The TV receiver 4010 includes an ISDB decoder 4011, an NTSC decoder 4012, a teletext decoder 4013 and a digital CATV decoder 4014, in order to decode the received signals. It also includes a screen controller 4015, by which the user can select a desired broadcasting service. Since the TV receiver 4010 requires a plurality of decoders 4011 to 4014 simultaneously, it is economically disadvantageous.

Further, as regards the ISDB, unlike in the conventional television broadcasting, a multi-angle broadcasting has been proposed, in which a plurality of images, taken from different angles, are simultaneously displayed on the same screen. For example, the multi-angle broadcasting simultaneously displays, as a display image 4016 on the same plane, an image 4017 in a left side view, an image 4018 in a right side view, an image 4019 in a front view, and a guide image 4020 for controlling the images 4017 to 4019.

Thus, if various types of media are combined and an integrated broadcasting service is started the future, a user must select a desired channel from a great number of channels. For this reason, it will be necessary to introduce human interface technology, so that the user can select a desired channel easily and immediately. In the case of a television receiving system, the GUI using graphic images is used as the human interface technology.

In addition, since there are a number of types of image formats, an improved television receiver will be required, which can alter the number of scanning lines and display multiple images. Thus, in the future, when media (e.g., broadcasting, communication and packaging) are integrated, it will be necessary to provide a television receiver, which can provide an improved GUI function and deal with a number of types of image formats.

For example, the introduction of ICCE in 1994, pages 12 and 13, discloses a scanning line converting method, which can arbitrarily alter the number of scanning lines to minimize the degradation of an image. In the scanning line converting method, the sizes of images transmitted by interlaced scanning are synthesized in units of a frame and then altered.

However, in the scanning line converting method, although the size of an image obtained by interlaced scanning is altered with minimum degradation of the image, the size of the hardware is increased to perform a filtering process in a memory or the like.

When computer graphics are utilized, a GUI having a higher function can be realized. To generate a graphic image of a higher quality, a texture mapping process is applicable. The texture mapping process not only creates a polygon by means of conventional computer graphics, but also attaches a texture image to the polygon, thereby creating a more realistic image.

The texture mapping process allows different images to be attached to the respective parts of the polygon, as well as to the texture of a material surface. For this reason, application of the texture mapping process to the GUI is expected, for example, when a channel is selected in the multi-channel broadcasting, an image of each of the channels is attached as a texture to each part of the polygon, so that the user can select the channel more easily and quickly.

However, the texture mapping method is disadvantageous in that the texture is distorted due to a value in a depth direction based on a perspective conversion. In general, the distortion is called swim. To prevent the distortion, large-scaled hardware is required. A texture mapping process without swim, using relatively small-scaled hardware, is disclosed in, for example, the introduction of Television Society in 1994, pages 419 and 420.

The texture mapping method disclosed in this document, however, cannot sufficiently reduce the scale of hardware to a practical level.

As described above, constitution of a television receiving system, adaptable for all the television broadcasting services and the image formats, requires a scanning line conversion algorithm for converting an image format and an algorithm for mapping a texture into a polygon without distortion. However, to realize these algorithms, large-scaled hardware is required.

SUMMARY OF THE INVENTION

The present invention has been made considering the above problems, and its object is to provide an image processing apparatus which can achieve, without large-scaled hardware, a process for converting a number of types of image formats in the conventional broadcasting services and a process for creating a graphic image corresponding to the GUI or data services.

According to an aspect of the present invention, there is provided an image processing apparatus comprising:

a mapping device for mapping texture data into a polygon by subjecting apex data of the polygon to inverse affine transformation, thereby calculating coordinates of the texture data, the mapping device including a sum-of-product arithmetic device constituting a matrix for the inverse affine transformation;

a scanning line converting device for compressing and expanding an image signal in horizontal and vertical directions, the scanning line converting device including a sum-of-product arithmetic device for executing a convolution calculation of the filtering process; and means for switching the sum-of-product arithmetic device of the mapping device and the sum-of-product arithmetic device of the scanning line converting device in a time dividing manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a diagram for explaining an operation of generating an address to be supplied to a memory of the first embodiment;

FIGS. 4A to 4H are diagrams for explaining operations of the first embodiment;

FIG. 6 is a diagram for explaining an example of the display of the first embodiment;

FIGS. 8A to 8E are diagrams for explaining operations of the second embodiment; and FIG. 9 is a diagram for explaining an example of the display of the second embodiment.

DETAILED DESCRIPTION OF THE PREFERRED EMBODIMENTS

Embodiments of the present invention will be described with reference to the accompanying drawings.

Figure 1:
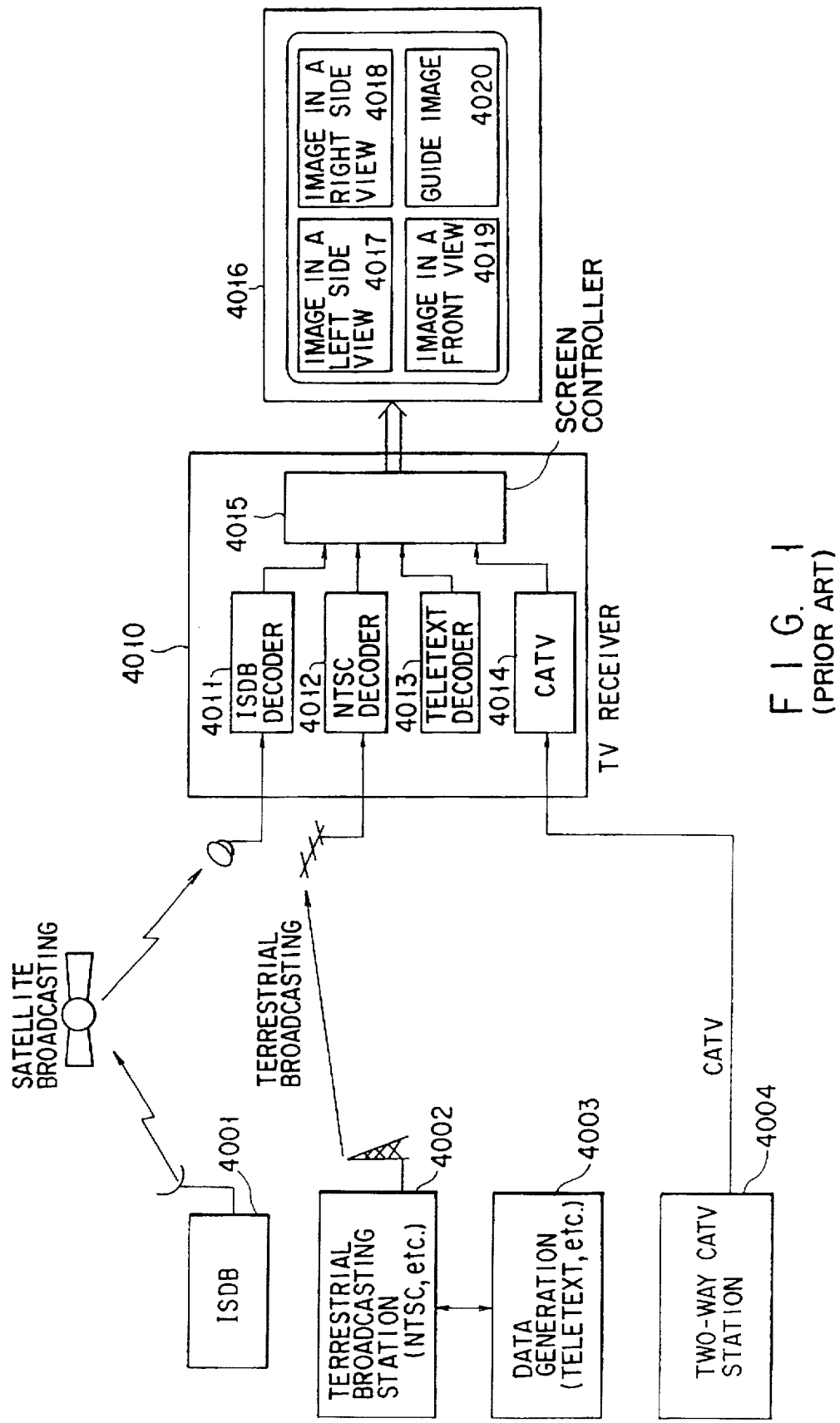
FIG. 1 is a block diagram schematically showing a television receiving system adapted for all the television broadcasting services and the image formats.
Figure 2:
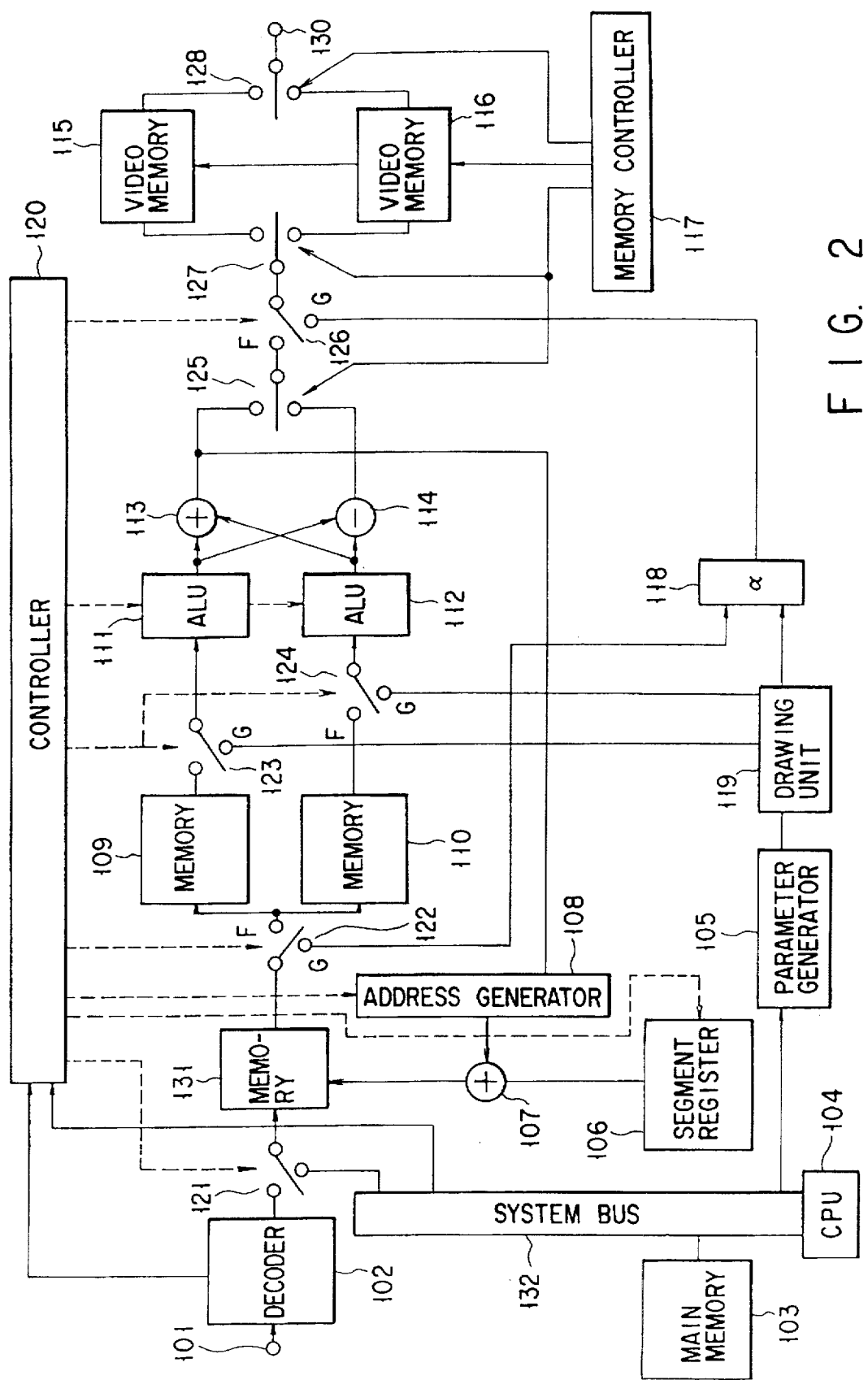
FIG. 2 is a block diagram showing an image processing apparatus according to a first embodiment of the present invention.

Referring to FIG. 2, showing a first embodiment of the present invention, an image signal is supplied to an input terminal 101. The image signal supplied to the input terminal 101 is supplied to a decoder 102 and decoded therein.

The signal decoded by the decoder 102 is supplied to a memory 131 through a switch 121. An image signal transmitted through a system bus 132 is also supplied to the memory 131 through the switch 121.

The memory 131 selectively stores the image signal output from the decoder 102 and the image signal transmitted through the system bus 132 by a switching operation of the switch 121. The switching operation of the switch 121 is controlled by a controller 120.

The memory area of the memory 131 is divided into regions, so that the image signal output from the decoder 102 and the image signal transmitted through the system bus 132 may not be mixed with each other. The division of the memory area of the memory 131 is controlled by an adder 107 and a segment register 106.

A memory region for storing an image signal is set in the segment register 106. The value set in the segment register 106 is synthesized with an address value output from an address generator 108 by the adder 107, thereby determining an address to be given to the memory 131.

FIG. 3 shows an address generating operation. The memory area of the memory 131 is divided into regions in accordance with the values set in the segment register 106. The segment register 106 is constituted by, for example, four registers 601, 602, 603 and 604. The value set in the register 601 designates a memory address 611 of the memory 131.

The address value output from the address generator 108 is added by the adder 107 to the value (reference value) set in the register 601, thereby generating an address in which a first image signal is to be stored. Similarly, the value set in the register 602 designates a memory address 612 of the memory 131. A second image signal is stored in a region corresponding to the memory address 612.

The values set in the registers 603 and 604 respectively designate memory addresses 613 and 614, in which third and fourth image signals are to be stored. In this way, four kinds of image signals can be stored in the memory of the example shown in FIG. 3.

A plurality of image signals can be read from the memory 131 shown in FIG. 2 in accordance with the addresses generated in the aforementioned operations. The image signals read from the memory 131 are selectively supplied to line memories 109 and 110 and a synthesizing circuit 118 by means of a switch 122.

The switch 122 is controlled by the controller 120, so that an image signal read from the memory 131 is supplied to the line memories 109 and 110 in a case of scanning line conversion, and to the synthesizing circuit 118 in a case of texture mapping.

Image signals read from the line memories 109 and 110 are respectively supplied to arithmetic circuits 111 and 112 through switches 123 and 124. The arithmetic circuits 111 and 112 subject the image signals to a filtering process, thereby executing scanning line conversion. In this case, one of the arithmetic circuit 111 or 112 extracts a temporal low frequency component and the other arithmetic circuit 112 or 111 outputs a temporal high frequency component.

Image signals output from the arithmetic circuits 111 and 112 are supplied to an adder 113 and a subtracter 114, and subjected to an adding operation and a subtracting operation, respectively. Image signals output from the adder 113 and the subtracter 114 are selectively supplied to a switch 126 by means of a switch 125, which is switched every field by a memory controller 117.

In a case of scanning line conversion, the switch 126 is switched by the controller 120 to a side F, where the image signal supplied through the switch 125 is selected. When outputting graphics, the switch 126 is switched by the controller 120 to a side G, where the image signal output from the synthesizing circuit 118 is selected. The image signal selected by the switch 126 is supplied to a switch 127.

The switch 127 is switched every field by the memory controller 117. For this reason, the image signal selected by the switch 126 is switched every field by the switch 127 so as to be supplied to and stored in two video memories 115 and 116. Image signals read from the video memories 115 and 116 are selectively output to an output terminal 130 by means of a switch 128, which is switched every field by the memory controller 117.

On the other hand, a graphic image is subjected to three-dimensional modeling by means of a host CPU (central processing unit) 104. Polygon data created by the three-dimensional modeling is stored in a main memory 103 and supplied to a parameter generator 105 through the system bus 132.

An image signal generated by the host CPU 104 as texture data is supplied to the memory 131 through the switch 121. The host CPU 104 also outputs coefficients used in the scanning line conversion and coefficients used in the inverse affine transformation required for the texture mapping process. The coefficients are supplied to the controller 120.

Affine transformation is a process for geometrically transforming model data represented in three dimensional space (x, y and z) coordinates in three dimensional computer graphics. In the geometric transformation, three dimensional (x, y and z) coordinates are subjected to rotation, parallel displacement and scaling by means of 4×4 matrix operations. Inverse affine transformation is an operation inverse to the affine transformation. This is also a geometric transforming process.

The parameter generator 105 detects an inclination of the polygon from the input polygon data and outputs it to a drawing unit 119. The drawing unit 119 paints the polygon along edges based on the result of detection by the parameter generator 105. It also generates a coordinate address for texture mapping. The generated coordinate address is supplied in parallel to the switches 123 and 124.

Coordinate addresses selected by the switches 123 and 124 are subjected to a matrix calculation for the inverse affine transformation by the arithmetic circuits 111 and 112. Coordinate addresses output from the arithmetic circuits 111 and 112 are added by the adder 113, so that texture coordinates are determined.

The texture coordinates thus determined are supplied to an address generator and converted to a memory address. An image signal read from the memory 131 based on the address is supplied to the synthesizing circuit 118 through the switch 122 and attached to the drawn polygon output from the drawing unit. A graphic image thus generated is supplied to the switch 126. The switch 126 switches the graphic image and the scanning line conversion image supplied from the switch 125, which are output to the video memories 115 and 116.

FIGS. 4A to 4H show operations of the first embodiment described above. In the following, to make the explanation simple, an interlaced signal of five scanning lines is finally converted to successive scanning signals of the five scanning lines. An input image signal 202 has 2.5 scanning lines in one field period (1/60 second).

The image signal 202 is written in an image memory 202 (for example, the line memory 109 or 110 in FIG. 2), and read therefrom at a rate twice that at which it was written. As a result, as indicated by numeral 203, a signal including five scanning lines in 1/60 second is generated. The signal are supplied to the arithmetic circuits 111 and 112 and the temporal low frequency component 204 and the temporal high frequency component 205 are generated.

In this case, assuming that an image signal in a first field is A and an image in a second field is B, the temporal low frequency component is represented by A+B and the temporal high frequency component is represented by A−B. For this reason, when the adder 113 performs an addition process of {(A+B)+(A−B)}/2, the image signal A in the first field is generated. When the subtracter 114 performs a subtraction process of {(A+B)−(A−B)}/2, the image signal B in the second field is generated.

The image signals A and B are alternately output through the switch 125 every field, and synthesized as indicated by numeral 206. The synthesized signals A and B are alternately supplied to the video memories 115 and 116 every 1/60 second by means of the switch 127.

Each of the video memories 115 and 116 alternately performs reading and writing operations every 1/60 second as indicated by numerals 207 and 208. Therefore, if a graphic image is written alternately in the video memories 115 and 116 every 1/60 second, an animation image can be generated and easily synthesized with a natural image.

Figure 5:
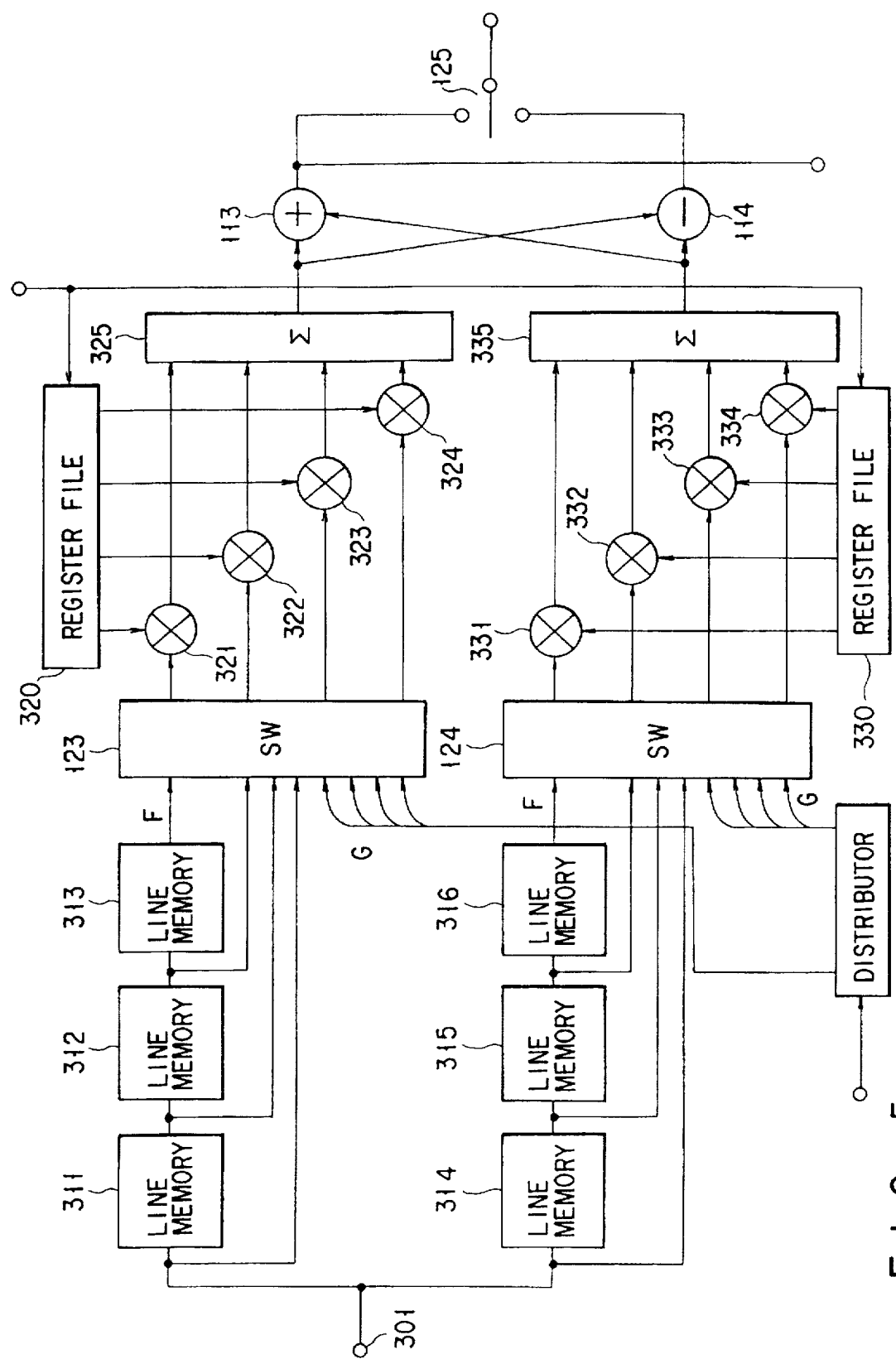
FIG. 5 is a block diagram showing details of the arithmetic circuit of the first embodiment.

FIG. 5 shows details of the arithmetic circuits 111 and 112. In FIG. 5, the same elements as shown in FIG. 2 are identified with the same reference numerals as used in FIG. 2. The line memory 109 shown in FIG. 2 is actually constituted by three line memories 311, 312 and 313, and the line memory 110 is constituted by three line memories 314, 315 and 316.

A signal selected by the switch 123 is supplied to multipliers 321, 322, 323 and 324, whereas a signal selected by the switch 124 is supplied to multipliers 331, 332, 333 and 334. The multipliers 321, 322, 323 and 324 multiply the signal selected by the switch 123 with a coefficient output from a register file 320. The multipliers 331, 332, 333 and 334 multiply the signal selected by the switch 124 with a coefficient output from a register file 330.

The results of multiplication by the multipliers 321, 322, 323 and 324 and the results of multiplication the multipliers 331, 332, 333 and 334 are respectively added by adders 325 and 335, thereby executing a convolution calculation. Thereafter, addition outputs from the adders 325 and 335 are respectively supplied to the adder 113 and the subtracter 114 and subjected to adding and subtracting operations. The results of adding and subtracting operations are switched every field and output through the switch 125.

In the first embodiment described above, since the arithmetic circuits 111 and 112 and the memory 131 are used both in graphic texture mapping function and scanning line converting function, these functions can be realized without increasing hardware.

In this case, since a control signal from the controller 120 is switched in a time divisional manner, it is possible to form on one screen a graphic image and a natural image, which is obtained by scanning line conversion. The time divisional switching of the control signal is executed by a software process by the host CPU 104.

FIG. 6 shows an example of the image created by the aforementioned time divisional process. As shown in FIG. 6, it is possible to simultaneously display a natural image and a graphic image on the same screen.

Figure 7:
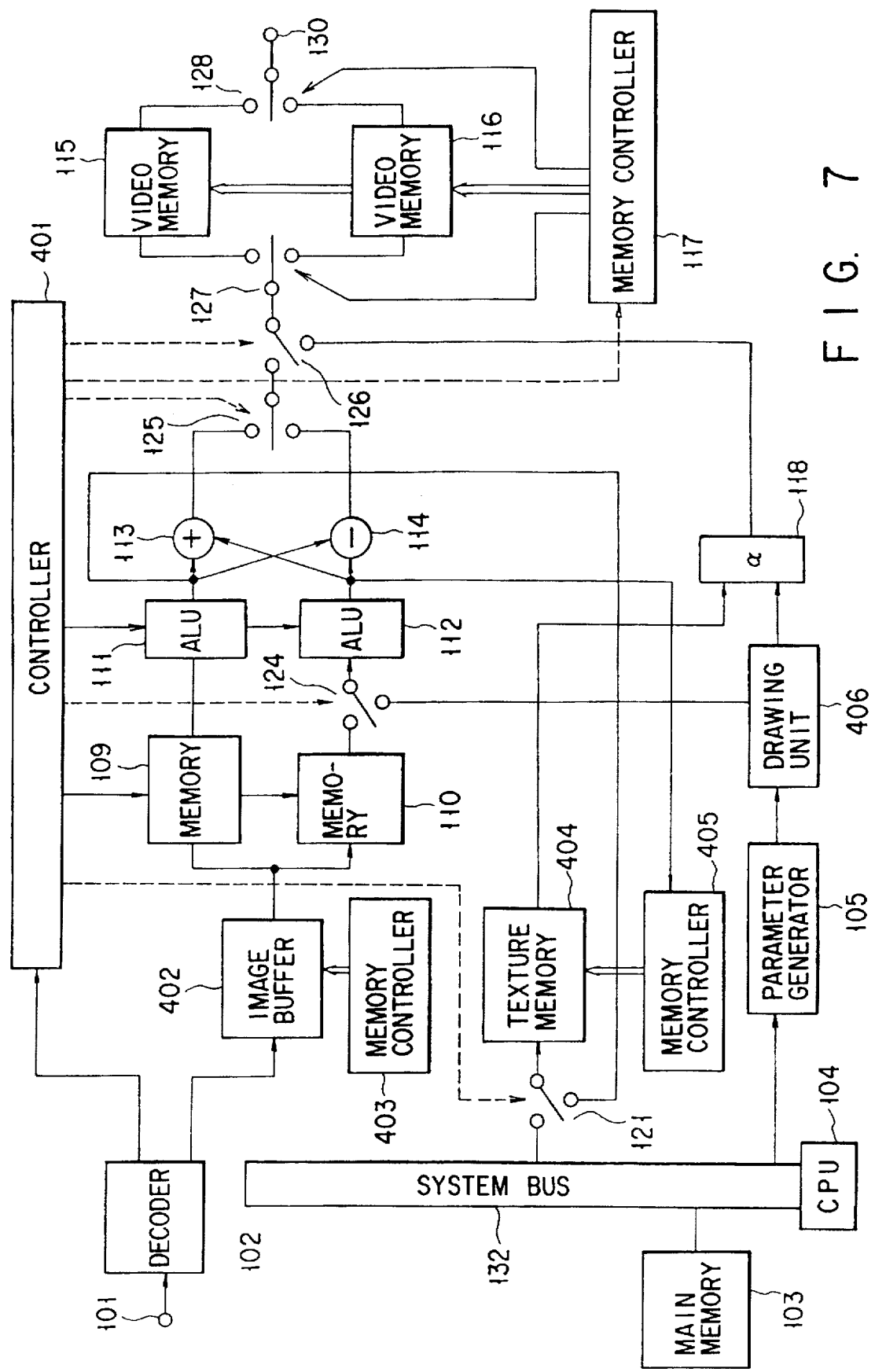
FIG. 7 is a block diagram showing an image processing apparatus according to a second embodiment of the present invention.

FIG. 7 shows a second embodiment of the present invention. In FIG. 7, the same elements as shown in FIG. 2 are identified with the same reference numerals as used in FIG. 2. In the second embodiment, an animation image is subjected to scanning line conversion, and then to mapping as a texture. In the same manner as in the first embodiment, an image signal is supplied from a decoder 102 to an image buffer memory 402.

In the second embodiment, the memory 131 shown in FIG. 2 is replaced by an image buffer memory 402 and a texture memory 404 and memory controllers 403 and 405 for respectively controlling these memories. Thus, the image buffer memory 402 and the texture memory 404 are controlled independent of each other.

An image signal read from the image buffer memory 402 is subjected to scanning line conversion through line memories 109 and 110, arithmetic circuits 111 and 112, an adder 113 and a subtracter 114, as in the first embodiment.

In the second embodiment, only a temporal low frequency component output from the arithmetic circuit 111 is mapped as a texture. An image signal output from the arithmetic circuit 111 is supplied to a switch 121. The switch 121 is switched on the basis of a control signal output from a controller 401, so that the image signal output from the arithmetic circuit 111 is supplied to the texture memory 404.

An image signal output from the texture memory 404 is synthesized with a polygon by the synthesizing circuit 118. In this time, the arithmetic circuit 111 is used to generate a temporal low frequency component, while the arithmetic circuit 112 is not used for the scanning line conversion. The arithmetic circuit 112 is therefore used for the graphic process. In other words, the arithmetic circuit 112 can be used to execute a matrix calculation for the inverse affine transformation.

More specifically, a coordinate address output from a drawing unit 406 is supplied through a switch 124 to the arithmetic circuit 112. The arithmetic circuit 112 executes a matrix calculation for the inverse affine transformation with respect to the input address. An output from the arithmetic circuit 112 is supplied to the memory controller 405. A texture is read from the texture memory 404 based on an address generated by the memory controller 405.

FIGS. 8A to 8E show operations of the second embodiment described above. Like the first embodiment, an interlaced image signal 502 is input. The image signal 502 is written in an image memory 501 (for example, the image buffer memory 402 in FIG. 7), and read therefrom at a rate twice that at which it was written as indicated by numeral 503.

The image memory 501 extracts a temporal low frequency component of the read image signal, and writes it in the texture memory 404 as indicated by numeral 504. The temporal low frequency component of the image signal is read from the texture memory 404 every 1/60 second as indicated by numeral 505, thereby mapping an animation image.

It is possible that an image signal is written in video memories 115 and 116 every 1/30 second. The graphic image may be written every 1/30 second, so that an animation image can be formed. Since signals are read from the video memories 115 and 116 by sequential scanning, the sequentially scanned image is displayed.

FIG. 9 is a diagram for explaining an example of the display of the second embodiment. As shown in FIG. 9, a special effect is obtained by attaching an animation image to a polygon by the texture mapping.

According to the embodiments as described above, when texture data is mapped into a polygon, apex data of the polygon data on an apex represented by the (x, y, z) coordinates of the polygon constituting the model data, is subjected to the inverse affine transformation. As a result, the structure of the mapping system for calculating coordinates of the texture data partially overlaps the structure of the scanning line converting system for compressing and expanding an image signal in vertical and horizontal directions. In this state, sum-of-product arithmetic means constituting a matrix for the inverse affine transformation of the mapping system and sum-of-product arithmetic means for executing a convolution calculation of the filtering process of the scanning line converting system are switched and used in a time dividing manner. Therefore, the amount of hardware can be decreased.

The present invention is not limited to the above embodiments, but can be modified variously without departing from the scope of the gist of the invention.

As has been described above, with the image processing apparatus according to the present invention, the arithmetic circuits and memories are used in a time dividing manner for the scanning line converting process and the graphic image generating process. Thus, a graphic image of high quality, with no scanning line conversion or distortion, can be generated without increasing the amount of hardware. In addition, according to the scanning line conversion method of the present invention, an image signal is divided into a temporal low frequency component and a temporal high frequency component, which are respectively converted through the filtering process. Moreover, the texture mapping of the present invention utilizes the inverse affine transformation method.

In the present invention, these methods are dealt with together. Therefore, for example, when an image obtained by the scanning line conversion and an image obtained by the texture mapping are to be displayed simultaneously, it is possible that an image signal is subjected to the scanning line conversion by the arithmetic means for filtering the temporal low frequency component of the image signal and, at the same time to the inverse affine transformation for filtering the temporal high frequency component thereof by another arithmetic means.

What is claimed is:

1. An image processing apparatus comprising:

a first sum-of-product arithmetic device;

a second sum-of-product arithmetic device;

a mapping device for mapping texture data into a polygon by subjecting apex data of said polygon to inverse affine transformation, thereby calculating coordinates of said texture data, said mapping device including said first sum-of-product arithmetic device comprising a matrix for said inverse affine transformation;

a scanning line converting device for compressing and expanding an image signal in a horizontal direction and a vertical direction, said scanning line converting device including said second sum-of-product arithmetic device to execute a convolution calculation of a filtering process, wherein said scanning line converting device executes a scanning line converting operation with respect to a temporal high frequency component and a temporal low frequency component of said image signal; and switching means for switching said first sum-of-product arithmetic device and said second sum-of product arithmetic device in a time dividing manner.

2. The image processing apparatus according to claim 1, wherein said scanning line converting device executes said scanning line converting operation with respect to only said temporal low frequency component of said image signal, when an image obtained by a texture data mapping operation and an image obtained by said scanning line converting operation are to be displayed simultaneously.

3. An image processing apparatus comprising:

a first sum-of-product arithmetic device;

a second sum-of-product arithmetic device;

a mapping device for mapping texture data into a polygon by subjecting apex data of said polygon to inverse affine transformation, thereby calculating coordinates of said texture data, said mapping device including said first sum-of-product arithmetic device comprising a matrix for said inverse affine transformation;

a scanning line converting device for compressing and expanding one of a plurality of image signals in a horizontal direction and a vertical direction, said scanning line converting device including said second sum-of-product arithmetic device for executing a convolution calculation of a filtering process;

switching means for switching said first sum-of-product arithmetic device and said second sum-of product arithmetic device in a time dividing manner;

a memory to store said plurality of image signals including one of said plurality of image signals corresponding to said texture data;

image signal switching means for switching said plurality of image signals read out from said memory as part of a texture data mapping operation and a scanning line converting operation, in said time dividing manner; and recording and mapping means for recording an image obtained by said scanning line converting operation in said memory; and for mapping said image as said texture data to said polygon.

4. An image processing apparatus comprising:

scanning line converting means for compressing and expanding an image signal in horizontal and vertical directions, including:

first arithmetic means for extracting a temporal low frequency component from an image signal and executing a first filtering process for a scanning line converting operation to compress and expand said temporal low frequency component in said horizontal and said vertical directions; and second arithmetic means for extracting a temporal high frequency component from said image signal and executing a second filtering process for said scanning line conversion operation to compress and expand said temporal high frequency component in said horizontal and vertical directions; and switching means for switching said first and second arithmetic means, such that, in a textured data mapping operation to map texture data into a polygon, said second arithmetic means is caused to execute a matrix calculation for inverse affine transformation to obtain coordinates of said texture data.

* * * * *